June 18, 1968 S. M. WOHL ET AL 3,388,517
GASKET FOR SEALING A WINDOWPANE AND METHOD
FOR INSTALLING THE SAME
Filed April 14, 1966 4 Sheets-Sheet 4

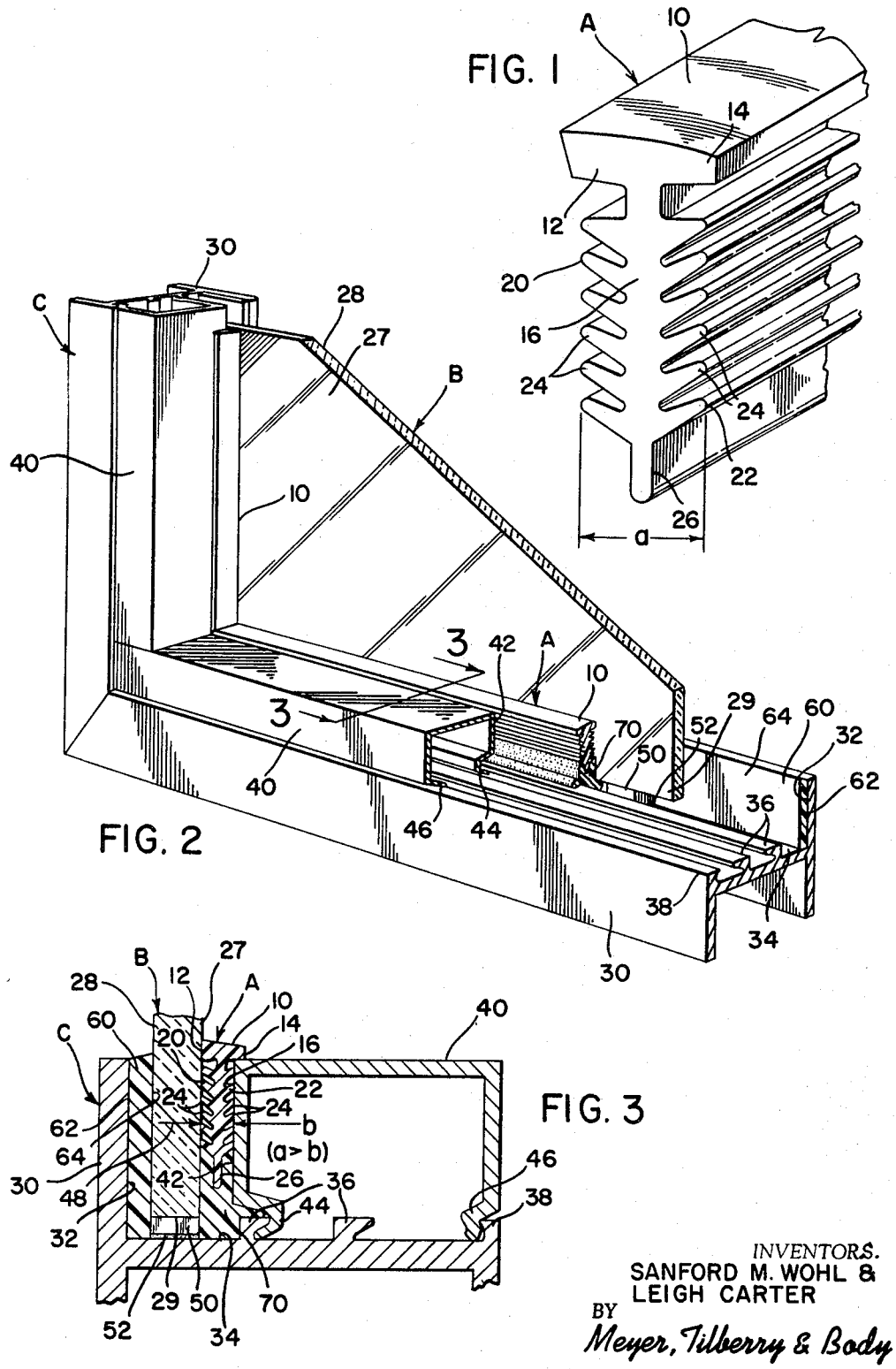
June 18, 1968   S. M. WOHL ETAL   3,388,517
GASKET FOR SEALING A WINDOWPANE AND METHOD
FOR INSTALLING THE SAME
Filed April 14, 1966   4 Sheets-Sheet 1
INVENTORS.
SANFORD M. WOHL &
LEIGH CARTER
BY
Meyer, Tilberry & Body
ATTORNEYS

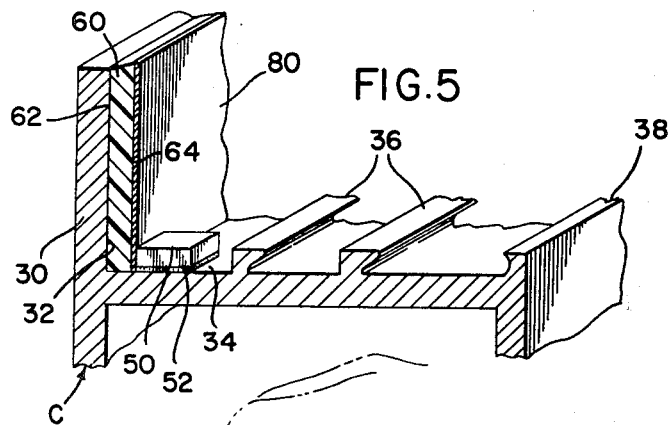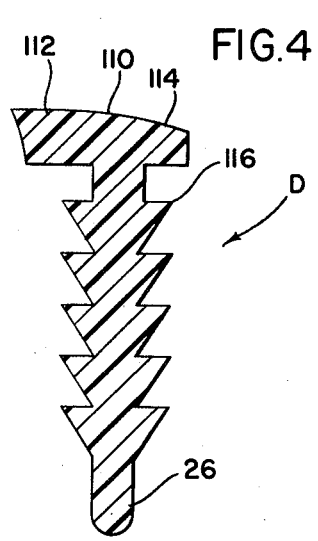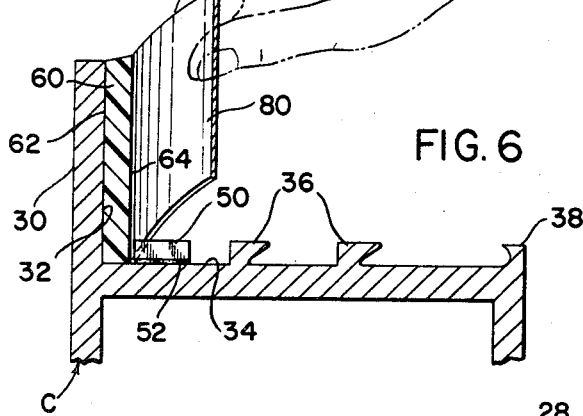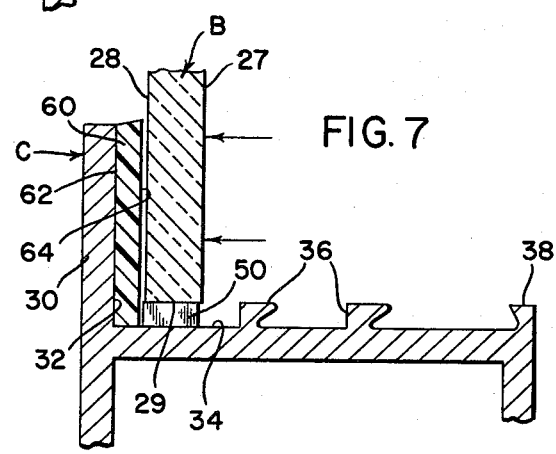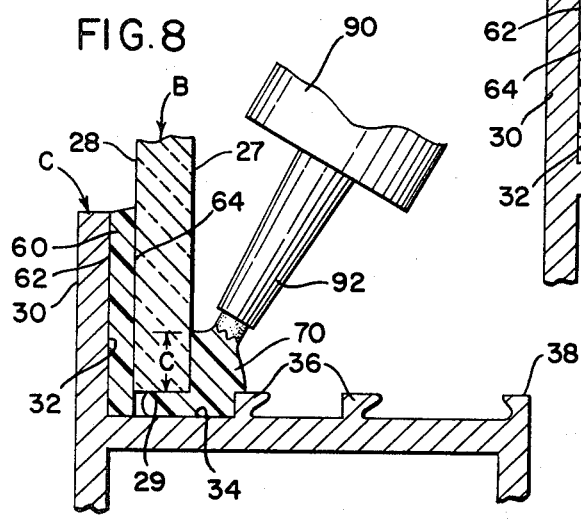

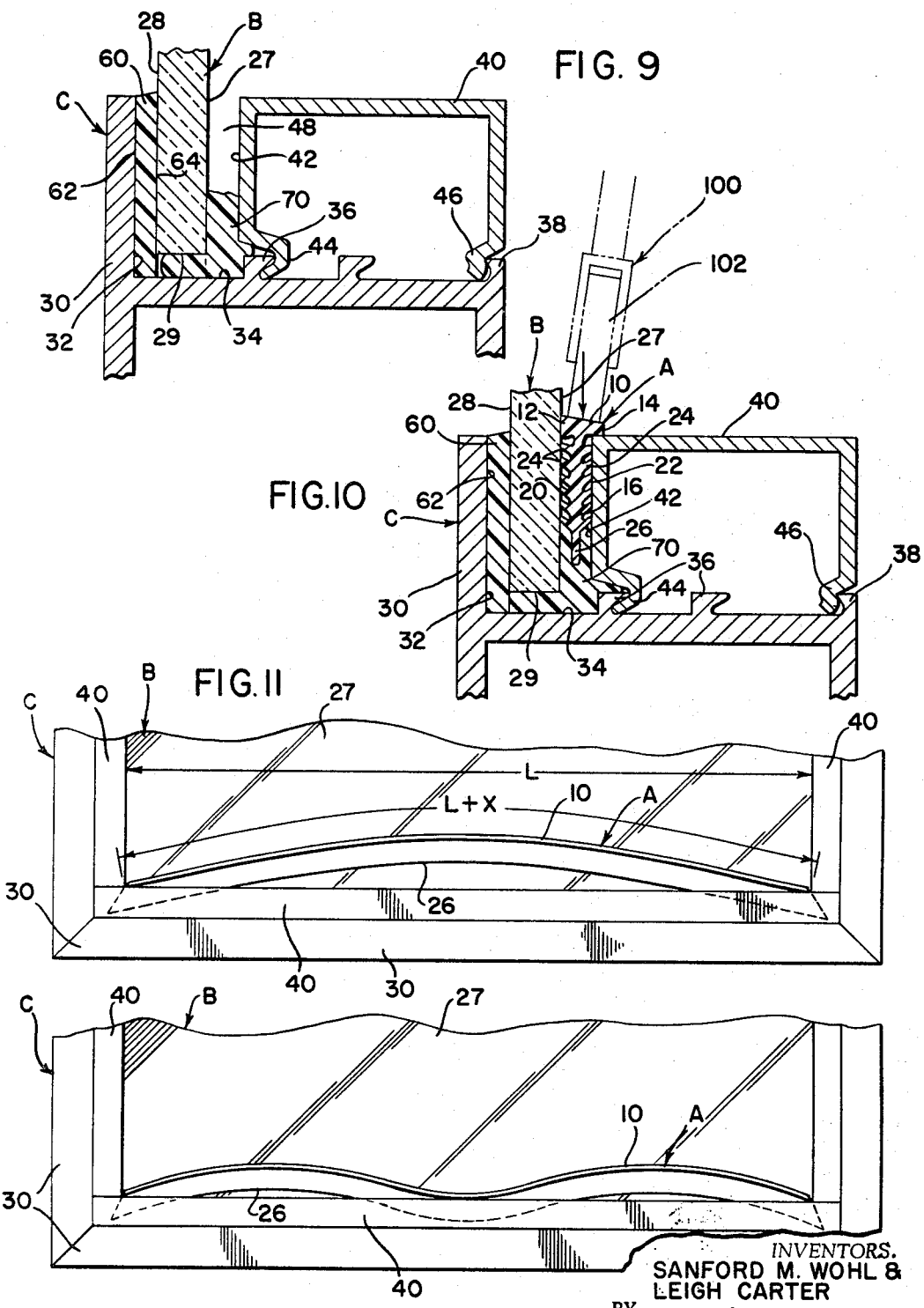

*INVENTORS.*
SANFORD M. WOHL &
LEIGH CARTER
BY
*Meyer, Tilberry & Body*

ATTORNEYS

United States Patent Office 3,388,517
Patented June 18, 1968

3,388,517
GASKET FOR SEALING A WINDOWPANE AND METHOD FOR INSTALLING THE SAME
Sanford M. Wohl, University Heights, and Leigh Carter, Shaker Heights, Ohio, assignors to The Tremco Manufacturing Company, Cleveland, Ohio, a corporation of Ohio
Filed Apr. 14, 1966, Ser. No. 542,681
14 Claims. (Cl. 52—403)

ABSTRACT OF THE DISCLOSURE

There is provided a resilient sealing strip for use between a windowpane and its support structure. This strip includes a flange which extends into a space between the pane and the support structure to form a friction seal with these members. In addition, a lower blade-like element is formed onto the sealing strip so that this element can form a wet seal with a mastic material at the bottom of the aforementioned space.

Disclosure

This invention pertains to the art of sealing windowpanes and, more particularly, to a gasket for sealing a windowpane and a method for installing the same.

The invention is particularly applicable to the assembly and sealing of a windowpane with respect to its channel-shaped support frame, and it will be described with particular reference thereto; however, it should be appreciated that the invention has much broader applications and may be used to install and seal a variety of generally, flat structural elements with respect to peripheral support elements.

A windowpane is generally mounted within a channel-shaped mounting structure which extends around the periphery of the pane. This channel is formed from two separate structural elements. The first is a stationary frame member including a first wall parallel with the windowpane and a second wall perpendicular to the pane and extending therearound, and the second element is a removable molding which closes the channel after the windowpane has been assembled. A sealing structure or gasket is placed around the windowpane to prevent passage of moisture and other climatic elements through the joint between the pane and the mounting structure. Since the channel used for supporting the windowpane is generally formed from a metal, such as aluminum, which has a coefficient of thermal expansion somewhat different from the windowpane itself, any gasket for this type of installation must be effective to maintain a seal while the sealing space is constantly changing. In addition, the frame structures now widely used have relatively smooth surfaces which require a gasket which will seal against smooth surfaces without allowing seepage of moisture. The windowpane vibrates within its support channel; therefore, the gasket must absorb vibrations over a wide range of temperatures and must not be dislodged by vibrations of the pane. Since the frame around the windowpane generally is visible, the outer appearance of the gasket must be pleasing. No caulking compounds or unsightly elements can be exposed to view. When all of these requirements are taken together, it becomes readily apparent that an efficient, durable gasket for use between the windowpane and its support channel must exhibit a multitude of physical characteristics which are, in some instances, incompatible.

In an attempt to meet the various requirements for sealing a windowpane with respect to its peripheral extending support structure, it has been suggested that a caulking compound be applied by a gun around the periphery of the windowpane before the molding strip is assembled to hold the pane in place. The caulking compound often oozed from the joint and caused an unsightly outer appearance. For this reason, the caulking compound arrangement for sealing the windowpane has not proven to be completely satisfactory. To overcome the disadvantage of the caulking system, a dry sealing structure or gasket has become somewhat common. This dry sealing gasket includes an elongated resilient strip which is forced between the pane and the molding, after the molding has been assembled. The resiliency of the strip caused a frictional seal between the molding and the windowpane. In some cases, this resilient sealing strip includes an outwardly protruding, upper head that extends between the pane and the molding. This head creates a smooth outer appearance, and the strip will be hereinafter referred to as a "sealing strip." These sealing strip sealing structures, though widely used, have certain distinct disadvantages. Since they depend upon a dry seal between the windowpane and molding, they would often creep from their assembled position when the pane was subjected to vibrations. Also, the dry seal created between the sealing strip and the windowpane, or the molding, was not always positive and permanent. It was affected by setting or hardening of the sealing strip after it was assembled between the windowpane and the molding.

These and other disadvantages of the prior sealing structures or gaskets to be used between a windowpane and its support channel have been completely overcome by the present invention which relates to an improved sealing strip and a method of assembling the same between the windowpane and the outer molding.

In accordance with the present invention, there is provided an improvement in the general combination of a windowpane and a support structure coextensive with the peripheral edge of the windowpane. In accordance with this invention, the improvement includes a body of self-adherent mastic material, which is located in the bottom of the space between the widnowpane and the outer molding, and a sealing strip which is forced into this space. The sealing strip has an inwardmost extended portion that penetrates the mastic material to form a wet seal with the mastic material.

As is common knowledge, various self-adherent mastic materials are used for sealing the joint between two structural members, such as a windowpane and its support frame. This mastic material tenaciously adheres to most surfaces, and forms a tight seal therewith. Accordingly, this material has become popular in a variety of gasket or seal structures. In accordance with the invention as defined above, this mastic material is used in combination with a sealing strip having a downwardly extending end which is embedded within the mastic material to form a tight wet seal. The wet seal between the sealing strip and the mastic material prevents the sealing strip from creeping outwardly during vibration of the windowpane. The mastic material itself also forms a primary wet seal between the windowpane and the channel. This primary wet seal combines with both the wet and dry seal formed with the sealing strip to provide a greatly superior sealing structure that overcomes the disadvantages explained in connection with the prior sealing structures used in this particular environment. In addition, the sealing strip forms a dam which prevents the outward migration of the self-adherent mastic material.

In accordance with another aspect of the present invention, there is provided a method whereby a windowpane having a first and second flat surface and an outer peripheral edge is mounted within a supporting frame having a first wall parallel to the pane and a second wall perpendicular to the pane and extending around the peripheral edge thereof. This method comprises the steps of forcing the pane against the first wall and into sealing engagement therewith; applying a self-adherent mastic simultaneously onto the first and second surfaces and along the peripheral edge of the windowpane; assembling a structural member, such as a molding, around the edge to define a space between the first surface of the windowpane and the structural member with the mastic partially filling this space; and, forcing an elongated, resilient sealing strip with an innermost protrusion into this space with the protrusion extending into the mastic to form a sealing bond therewith.

By assembling a windowpane in accordance with the above-defined method, the disadvantages of the prior sealing structures or gaskets for a windowpane and its support frame are completely overcome. This method provides a combined wet and dry seal which has heretofore not been used in this particular environment.

The primary object of the present invention is the provision of an improved sealing strip for use between a windowpane and its support frame, which strip provides an efficient seal under widely varying conditions and does not shift from its assembled position.

Another object of the present invention is the provision of an improved sealing strip for use between a windowpane and its support structure, which strip forms both a wet and dry seal for the windowpane.

Still another object of the present invention is the provision of an improved sealing strip for use between a windowpane and its support frame, which strip is adapted for use in combination with a self-adherent mastic material to form both a wet and a dry seal for the windowpane.

Still another object of the present invention is the provision of a sealing structure between a windowpane and its support frame, which structure includes a mastic seal and a sealing strip having a lower portion adapted to be embedded within the mastic seal.

Still a further object of the present invention is the provision of a method for assembling a windowpane into its support frame, which method includes the application of a self-adherent mastic material into the space between the windowpane and its frame and insertion of a sealing strip into this space so that its lower extremity is embedded within and adhered to the mastic material.

These and other objects and advantages will become apparent from the following description used to illustrate the preferred embodiments of the invention as read in connection with the accompanying drawings in which:

FIGURE 1 is an enlarged pictorial view illustrating, somewhat schematically, the preferred embodiment of the present invention;

FIGURE 2 is a partially cross-sectioned, pictorial view illustrating the preferred embodiment of the present invention;

FIGURE 3 is an enlarged cross-sectional view taken generally along line 3—3 of FIGURE 2;

FIGURE 4 is an enlarged cross-sectional view illustrating a modification of the preferred embodiment of the invention shown in FIGURE 1;

FIGURES 5–14 illustrate a method of assembling a windowpane in accordance with the present invention; and, FIGURE 15 is a cross-sectional view showing a further modification of the preferred embodiment of the present invention as shown in FIGURE 1.

Figure 13:
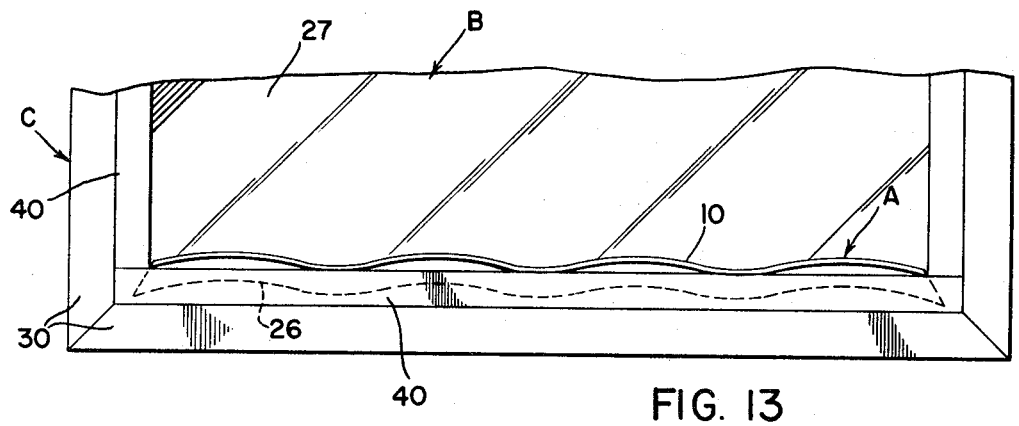
Figure 14:
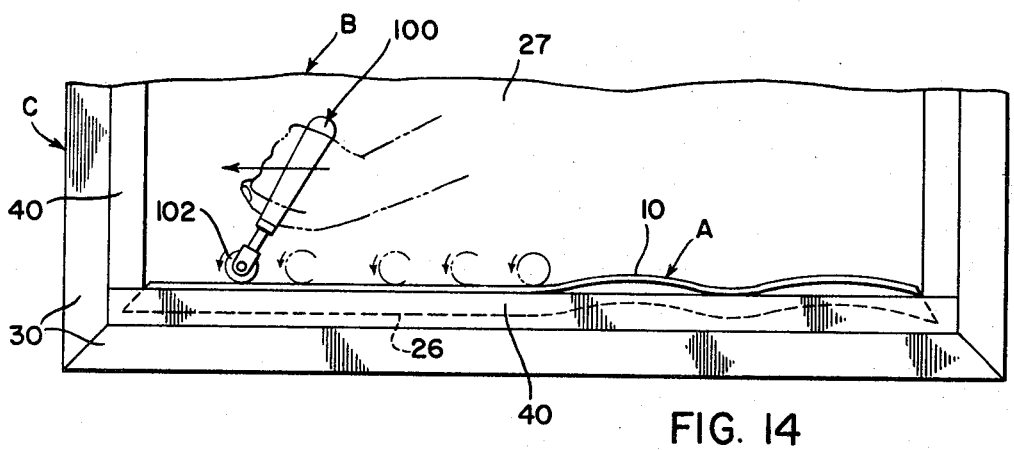

Referring now to the drawings wherein the showings are for the purpose of illustrating preferred embodiments of the invention only and not for the purpose of limiting same, FIGURES 1–3 show an elongated, resilient sealing strip A as contemplated by the present invention. This sealing strip is formed from any of a variety of plastic or rubber materials. In accordance with this embodiment of the invention, the strip A includes an upper, or outer, closing head 10 extending in opposite transverse directions to form head portions 12, 14. Extending downwardly from the head there is provided a sealing flange 16 having oppositely facing, outer sealing surfaces 20, 22. These surfaces are spaced from each other a distance $a$. Each of the surfaces 20, 22 is defined by a plurality of spaced resilient sealing ribs 24 which form a dry seal for the windowpane, as will be explained later in detail. The lowermost portion of the sealing strip A is provided with a blade-like protrusion 26, hereinafter referred to as a blade. It is appreciated that the blade 26 may take a variety of shapes. The shape illustrated in FIGURES 1–3 is only representative.

Referring now more particularly to FIGURES 2 and 3, the sealing strip A is used in the assembly of a windowpane B having a first surface 27, a second surface 28 and a peripheral edge 29. This pane is held within a support frame C extending around the windowpane. Since the frame is substantially identical on all sides of the pane, only the portion of the frame at the bottom or sill will be discussed in detail. In accordance with the preferred embodiment of the present invention, the support frame C includes a stationary frame 30 having a wall 32 generally parallel with surface 28 and a wall 34 generally perpendicular to surfaces 27, 28 and spaced outwardly from the peripheral edge 29. Also included on the stationary frame member are a plurality of inner lugs 36 and an outer lug 38. The frame 30 is preferably formed from an extruded metal, such as aluminum, and the lugs 36, 38 are used to removably secure a frame member or molding 40 in spaced relationship with wall 32. The molding 40 includes an inner wall 42, an inner lug 44, and an outer lug 46. The lugs 44, 46 coact with lugs 36, 38, respectively, to tightly secure the frame member or molding 40 with respect to the stationary frame member 30. When assembled, the molding 40 defines a space 48 between the inner wall 42 and the first surface 27 of windowpane B. As best shown in FIGURE 3, the space 48 has a transverse dimension $b$ which is slightly less than the dimension of sealing strip A so that the sealing strip A, when forced into the space 48, frictionally engages both the windowpane and the wall 42. This provides a somewhat conventional frictional seal between the ribs 24 and both the surface 27 and wall 42.

Beneath the windowpane B there are provided a plurality of setting blocks 50 secured onto wall 34 by appropriate adhesive layer 52. In accordance with a preferred embodiment, the setting blocks 50 are formed from a rubber material having a hardness of approximately 70–90 Shore "A." The purpose of these setting blocks will be described later. Between the pane B and wall 32 there is provided a coextensive resilient tape 60 having oppositely facing surfaces 62, 64. These surfaces are supplied with an adhesive to provide a sealing bond between the tape and the surfaces against which it is assembled. At the bottom of space 48 there is provided a self-adherent mastic body 70 extending along the peripheral edge 29 of the windowpane. The mastic body is formed from commonly used mastic material which remains tacky and has a paste-like viscosity or consistency. The mastic material flows into sealing contact with various surfaces within space 48. As force is applied to the mastic material, the material spreads into the intricate recesses at the bottom of space 48. As shown in FIGURE 3, the blade 26 at the lower end of the sealing strip A extends into the mastic body 70 to provide a wet, tenacious seal between the sealing strip and the mastic. The mastic also forms a wet seal or bond between the windowpane B, the lower wall 34 and the inner wall 42.

Sealing strip A is frictionally held within space 48 by outwardly extending ribs 24 to provide a dry seal at both the windowpane and the molding. In addition, the sealing strip provides a dam which prevents the outward extrusion of the mastic body 70. The sealing strip, in combination with the mastic body, provides both a wet and dry seal for the windowpane B. Vibration of the pane cannot cause outward movement of the sealing strip because it is locked into its assembled position by the adherent, mastic body 70. After the sealing strip is assembled, the head portion 12 contacts pane B and head portion 14 contacts molding 40. This provides a pleasing outer appearance for the overall sealing structure or gasket. The combined dry seal and wet seal for the windowpane maintains a tenacious and positive seal during widely varying climatic conditions even though the viscosity of the mastic body may change.

Another aspect of the present invention is the method of assembling pane B by using both the sealing strip A and the mastic body 70. The first step in this method is illustrated in FIGURE 5. After the stationary frame member 30 has been provided with the necessary contour to receive the pane B, the tape 60 with an outer backing sheet 80 is adhesively secured along wall 32. Thereafter, the setting blocks 50 are adhesively secured along the bottom wall 34. These blocks are used to maintain the windowpane B slightly above the wall 34. This centers the windowpane between the upper and lower frame structures and prevents a direct contact between the wall 34 and the edge of the windowpane. Of course, the adhesive 52 may be eliminated from the setting blocks 50 without changing their function. Referring now to FIGURE 6, the backing sheet 80 is stripped from the tape 60 to leave an exposed adhesive surface 64. The windowpane is then moved into position, as shown in FIGURE 7, and shoved backwardly against the surface 64. This forms an adhesive sealing bond between surface 28 of the windowpane and surface 64 of the tape 60.

Thereafter, as shown in FIGURE 8, a mastic gun 90 having a nozzle 92 forces the mastic body 70 against the lower edge or periphery of the windowpane B. This mastic flows somewhat readily so that it extends along surface 34 under the windowpane B. To provide a sufficient amount of mastic material within body 70, the mastic material must overlap the peripheral edge of the windowpane, as best shown in FIGURE 8. This overlap, designated as $c$, is preferably more than $3/16$ inch. Of course, certain variations may be made in this overlap. Care should be taken that an excessive amount of mastic material is not applied to the lower edge of the window. Excessive amounts of mastic could prevent proper insertion of the sealing strip, the assembly of which will be explained later.

Referring now to FIGURE 9, the molding 40 is now snapped into place with the lugs 44, 46 lapping over lugs 36, 38, respectively. In this manner, the relatively narrow space 48 is created, and the mastic body 70 is extruded upwardly within this space. At the same time, the mastic flows outwardly and inwardly at the bottom of the space to fill the vacant areas at the lower portion of space 48. After the molding 40 has been secured in place, the sealing strip A is forced downwardly into space 48, as shown in FIGURE 10. An implement 100 having a roller 102 is used to force the sealing strip into its assembled position. The blade 26 enters the mastic body 70 and further extrudes the body to form a tight seal between this mastic body and all surfaces which it contacts. In this manner, the sealing strip A is held in place. The upper head 10 of the sealing strip slopes downwardly and away from the surface 27 to provide a pleasing outer appearance.

One important aspect of the present invention involves the assembly of the sealing strip into the space 48. In accordance with this aspect of the invention, the sealing strip is cut so that the head portion has a length $L+X$. L represents the length of the daylight or sight opening defined by spaced molding members 40, as shown in FIGURE 11. In other words, the head portion, or the exposed portion, of the sealing strip has a length slightly larger than the length of the space into which it is forced. In practice, if the length L is less than 2 feet, X is ½ inch. If the length L is 2–4 feet, X is ¾ inch, and if L is 4–8 feet, X is 1 inch. For lengths exceeding 8 feet, similar proportionate values can be given to X. As shown in FIGURE 11, the ends of sealing strip A beyond the sight opening are mitered at approximately 45° to receive the sealing strip extending along the adjacent moldings.

The first step in assembling the sealing strip, in accordance with the preferred embodiment of the invention, is to force each end of the sealing strip into place within space 48. This forms a catenary span as shown in FIGURE 11. Thereafter, the sealing strip is forced into space 48 adjacent the center portion of the sight opening. This is shown in FIGURE 12. After this has been accomplished, the sealing strip is forced into the space opening at positions intermediate the center and end portions as shown in FIGURE 13. Then, the implement 100 with roller 102 is moved from the center toward each edge of the sight opening. This forces the sealing strip downwardly into the space 48. In this manner, the sealing strip A is assembled with a slight amount of compression. Thus, the strip does not tend to contract and pull away from the corners of the joint. If the strip were first assembled at one end of the sight opening and then rolled toward the other end, the strip would be stretched. This would leave an excessive amount of the strip at the far end of the sight opening. The strip would then have to be cut and assembled. In this stretched condition, the strip would tend to return to an unstressed condition. This would pull the strip away from the corner of the frame C. It is appreciated that other similar arrangements could be used for assembling the sealing strip into the space 48. For instance, the sealing strip could be forced downwardly into the space 48 at a plurality of randomly selected points. This would in turn prevent stretching during the final rolling operation.

After the sealing strip has been assembled adjacent one edge of the sight opening, the other sealing strips are assembled in a like manner until the sealing strip extends completely around the sight opening.

A slight modification of the preferred embodiment of the invention is shown in FIG. 4. In accordance with this embodiment, the sealing strip D is provided with an upper head 110 having oppositely extending head portions 112, 114. The head portion 112 extends outwardly a greater distance than the head portion 114. In this manner, a tighter seal is created between the windowpane and the head of the sealing strip. Also in accordance with this invention, the spaced ribs 116 are triangular in cross-section. This provides a more rigid rib structure to allow a lesser rib deformation during insertion of the sealing strip into the elongated space 48.

Figure 15:
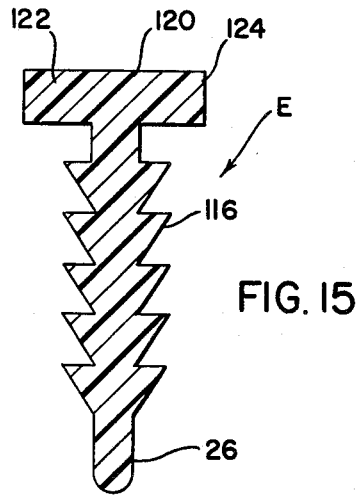

Still a further modification of the present invention is illustrated in FIGURE 15. In accordance with this embodiment of the invention, the head 120 is relatively square and centered with respect to the body of the sealing strip E. Consequently, the oppositely facing head portions 122, 124 are substantially identical. This embodiment of the invention illustrates the concept that a variety of head constructions can be provided on the sealing strip without departing from the intended spirit and scope of the present invention.

The present invention has been described in connection with certain structural embodiments and process or methods of operation; however, it should be appreciated that various modifications may be made in these embodiments and steps without departing from the intended spirit and scope of the present invention as defined in the appended claims.

Having thus described our invention, we claim:

1. In the combination of a windowpane having a first and second flat surface and an outer peripheral edge; a channel coextensive with said edge and receiving said edge with a space being defined by said channel and said first surface; a sealing structure in said space and in sealing contact with said channel and said first surface; said sealing structure including an elongated, resilient sealing strip coterminous with said channel and having an outwardly facing head contacting said first surface and an inwardly extending flange extending into said space, said strip forming a seal between said first surface and said channel; the improvement comprising: a body of self-adherent mastic material in said space and below said strip, said mastic body being coterminous with said edge and adhering onto both said pane and said inwardly extending flange to assist in holding said strip within said space.

2. The improvement as defined in claim 1 wherein said flange of said strip includes an inwardly extending blade-like protrusion coterminous with said flange, facing away from said head, and embedded within said mastic body.

3. The improvement as defined in claim 2 wherein said flange includes transversely spaced, oppositely facing sealing surfaces generally parallel with said first surface of said windowpane, one of said sealing surfaces forming a seal with said first surface of said pane and the other of said sealing surfaces forming a seal with said channel.

4. The improvement as defined in claim 3 wherein said sealing surfaces are defined by a plurality of easily deformable, sealing ribs generally perpendicular to said first surface of said windowpane.

5. The improvement as defined in claim 4 wherein space has a dimension $b$ generally perpendicular to said first surface, and said flange has a total transverse, unassembled dimension $a$, with $a$ being substantially greater than $b$.

6. In combination of a strip for insertion into an elongated space having a given width and defined by the peripheral portion of one surface of a windowpane and a generally parallel, closely spaced surface of a windowpane support frame, a self-adherent, mastic material deposited in the bottom of said space, said strip comprising: a head adapted to contact said surface of said windowpane; a flange adapted to extend into said space, said flange having a thickness at least slightly larger than the width of said space to cause frictional engagement with said generally parallel surfaces; and, a lower protrusion embedded into said mastic material upon insertion of said strip.

7. A strip as defined in claim 6 wherein said protrusion is a blade-like element having a width substantially less than the width of said space and being coextensive with said flange.

8. A strip as defined in claim 6 wherein said flange includes a plurality of spaced, easily deformable sealing ribs facing said surfaces.

9. A strip as defined in claim 6 wherein said head extends transversely outward in opposite directions from said flange to define two spaced head portions.

10. A strip as defined in claim 9 wherein one of said head portions extends outwardly from said flange a greater distance than the other head portion.

11. A method for installing a windowpane having a first and second flat surface and an outer peripheral edge into a supporting frame having a first wall parallel with said second surface and extending around said edge to form a daylight opening and a second wall perpendicular to said first wall and extending around said peripheral edge, said method comprising the following steps:
(a) forcing said pane against said first wall and into sealing engagement therewith;
(b) applying a self-adherent mastic simultaneously onto said second wall and said first surface and along said peripheral edge;
(c) assembling a structural member around said edge to define a space between said first surface and said member with the mastic partially filling said space; and,
(d) forcing an elongated, resilient sealing strip with an innermost protrusion into said space with said protrusion extending into said mastic to form a sealing bond therewith.

12. The method as defined in claim 11 wherein said daylight opening has at least one generally straight side formed by said first wall, said straight side having a length L, said method including the following steps:
(e) providing said sealing strip with a length $L+X$;
(f) forcing said strip into said space adjacent the opposite ends of said straight side;
(g) then, forcing said sealing strip into said space intermediate said opposite ends; and,
(h) thereafter, forcing the remainder of said strip into said space whereby said strip is mounted onto said space in a state of slight compression.

13. The method as defined in claim 11 wherein said daylight opening has at least one generally straight side formed by said first wall, said straight side having a length L, said method including the following steps:
(e) providing said sealing strip with a length $L+X$;
(f) forcing said strip into said space adjacent the opposite ends of said straight side;
(g) then, forcing said strip into said space at a plurality of points intermediate said opposite end; and,
(h) thereafter, forcing the remainder of said strip into said space whereby said strip is mounted into said space in a state of slight compression.

14. The method as defined in claim 11 wherein said daylight opening has at least one generally straight side formed by said first wall, said straight side having a length L, said method including the following steps:
(e) providing said sealing strip with a length $L+X$;
(f) forcing said strip into said space at a plurality of points along said straight side; and,
(g) thereafter, forcing the remainder of said strip into said space whereby said strip is mounted into said space in a state of slight compression.

References Cited

UNITED STATES PATENTS

| | | | |
|---|---|---|---|
| 2,280,389 | 4/1942 | Edwards | 52—403 |
| 3,150,748 | 9/1964 | Liskey | 52—403 |

FOREIGN PATENTS

| | | |
|---|---|---|
| 855,002 | 11/1960 | Great Britain. |
| 552,414 | 5/1957 | Belgium. |

REINALDO P. MACHADO, *Primary Examiner.*